United States Patent [19]

Sakurada et al.

[11] 4,432,628
[45] Feb. 21, 1984

[54] FILM TRANSPORTATION DISPLAY DEVICE

[75] Inventors: Nobuaki Sakurada; Masayoshi Kiuchi; Masahiro Thunoda, all of Kanagawa, Japan

[73] Assignee: Canon Kabushiki Kaisha, Tokyo, Japan

[21] Appl. No.: 410,691

[22] Filed: Aug. 23, 1982

[30] Foreign Application Priority Data

Aug. 27, 1981 [JP] Japan .................................. 56-134581

[51] Int. Cl.³ .......................... G03B 1/66; G03B 17/18
[52] U.S. Cl. ................................ 354/289.12; 354/217
[58] Field of Search ................................ 354/217, 289

[56] References Cited

U.S. PATENT DOCUMENTS 4,355,877 10/1982 Morisawa ..................... 354/289 X
4,373,796 2/1983 Matsuura et al. .............. 354/289 X Primary Examiner—Michael L. Gellner
Attorney, Agent, or Firm—Toren, McGeady and Stanger

[57] ABSTRACT

When the film is being transported, a signal forming circuit produces a pulse signal. Based on this pulse signal, a prescribed plurality of signals are formed and applied to a decoder driver so that a plurality of displaying areas positioned side by side in a display are actuated successively in one direction. As the displayed pattern appears to flow, the camera operator is able to recognize that film transportation is in progress.

7 Claims, 4 Drawing Figures

FILM TRANSPORTATION DISPLAY DEVICE

BACKGROUND OF THE INVENTION

1. Field of the Invention

This invention relates to a film transportation display device making it possible to be readily aware of film transporting conditions.

2. Description of the Prior Art

The conventional film transportation display devices have informed users of the film transporting conditions by means of a mechanical marker waving to and fro, or a lamp, or a light-emitting diode turning on intermittently in response to the progress of film transportation. But this method has the disadvantages that the one is hardly aware of presentation of the display, or it is difficult to recognize, and that the display does not change over between film winding and film rewinding, thereby to making it impossible to tell whether winding or rewinding is in progress.

It is an object of the present invention to eliminate the above-described drawbacks and to provide a display device with a control circuit in such form that a plurality of display elements are successively actuated so as make the displayed pattern flow in one direction, thereby making it easily visually recognized.

Another object of the present invention is to change the flow direction of the displayed pattern depending on whether the film is wound up or rewound.

These and other objects of the present invention will become apparent from the following description of an embodiment thereof.

SUMMARY OF THE INVENTION

It has now been found that these object of the invention may be attained in a film transportation display device having a pulse forming means for producing a pulse signal when a film is transported, a first circuit means for producing a plurality of pulse signals in a prescribed relationship based on the pulse signal from the pulse forming means, and display means for displaying film transporting conditions. The display means may have a plurality of display elements. The apparatus may also include a second circuit means for actuating the plurality of display elements in the display means to present a display pattern as if it were flowing in one direction based on the plurality of pulse signals from the first circuit means.

DESCRIPTION OF THE PREFERRED EMBODIMENTS

An embodiment of the present invention will be described thereof by reference to the drawings.

Figure 1:
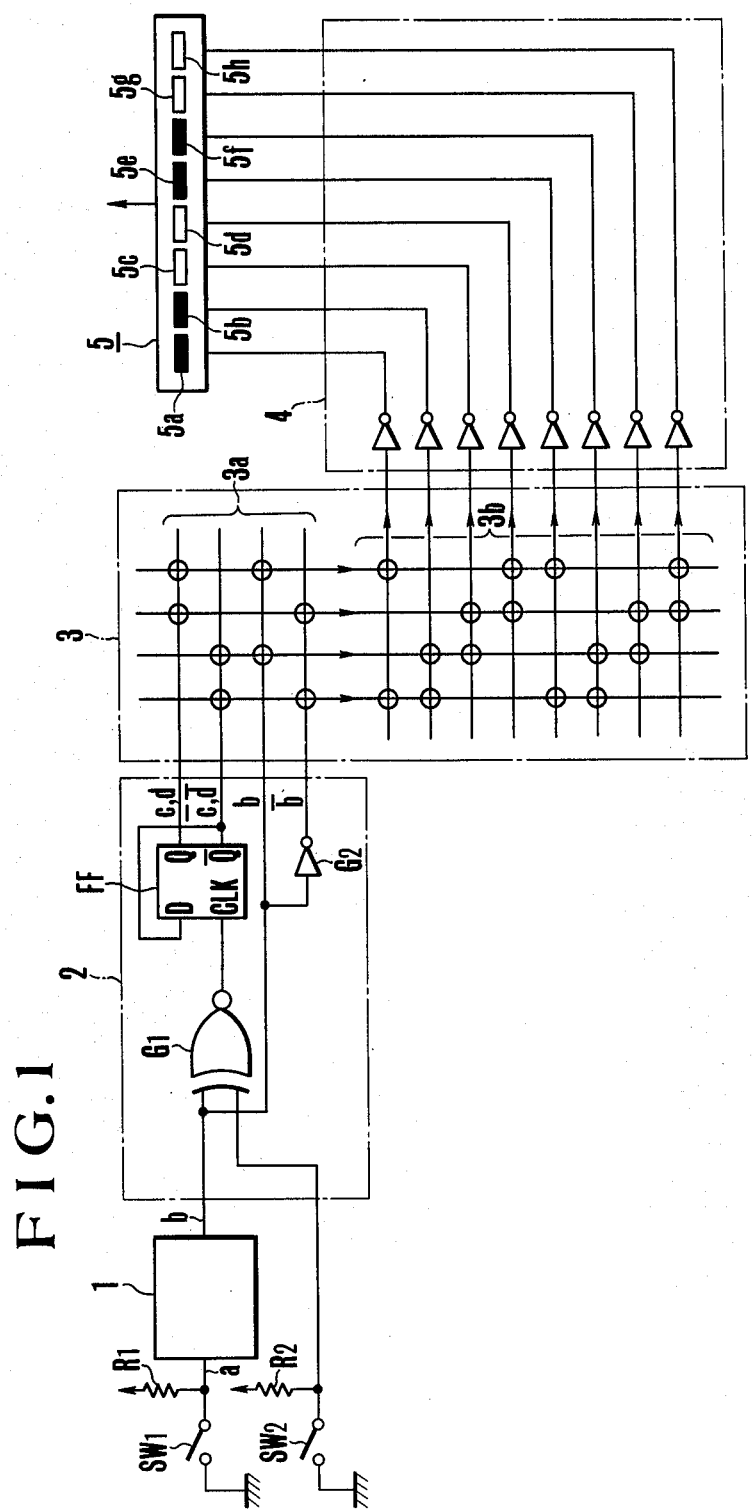
FIG. 1 is an electrical circuit diagram of an embodiment of a film transportation display device according to the present invention.

FIG. 1 illustrates the circuitry of the device, where SW1 is a sensor switch for sensing film transportation conditions; SW2 is a changeover switch responsive to a changing over between the winding and rewinding modes; reference numerals R1, R2 identify pullup resistors for the respective switches SW1 and SW2; a waveform shaping circuit 1 is receptive of a signal representing the opening and closing of switch SW1, for example, in the form of an RC time constant circuit; an UP/DOWN counter 2 counts the up or down signal from the aforesaid wave-form shaping circuit 1, comprising an Exclusive NOR GATE G1, a flip-flop FF, and an inverter G2. The output signal of the aforesaid waveform shaping circuit 1 and a signal representing the opening or closing of the switch SW2 are applied to the Exclusive NOR GATE G1 and an output of this Exclusive NOR GATE G1 enters the flip-flop FF at a clock terminal CLK thereof. The output of an output terminal Q of this flip-flop FF is routed to an input terminal D thereof. And, the outputs of the output terminals Q and Q of the flip-flop FF, the output signal of the waveform shaping circuit 1, and its inverted signal by the inverter G2 are produced as signals from the counter 2. A decoder 3 decodes the outputs of the counter 2 with its vertical rows being supplied with signals successively and with its horizontal rows in the lower part being supplied with signals simultaneously. Therefore, the points of intersection of the vertical and horizontal lines in the upper part 3a constitute "and", and those in the lower part 3b constitute "or". The numeral reference 4 identifies a drive circuit for a display 5. Applied to this drive circuit 4 are the outputs of the decoder 3. The display 5 has a plurality of display elements 5a to 5h positioned side by side.

Figure 2:
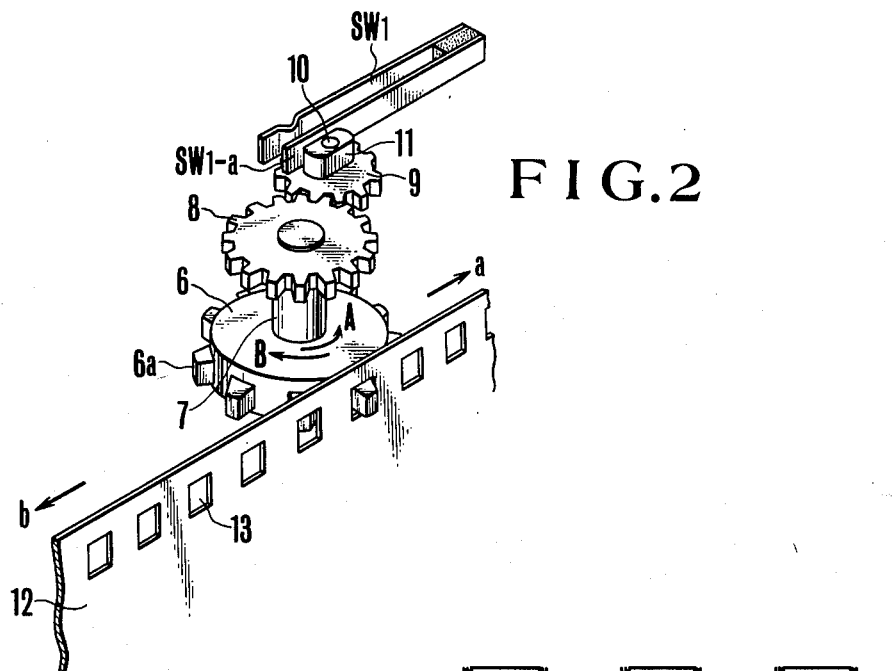
FIG. 2 is a perspective view of a construction and arrangement of an actuator mechanism for the switch of FIG. 1.

FIG. 2 is a perspective view which illustrates a mechanism for opening and closing the aforesaid switch SW1 when the film is being transported, comprising a gear 8 fixedly mounted on a shaft 7 of a sprocket 6, a pinion 9 meshing with the gear 8, and a cam 11 fixedly mounted on a common shaft 10 of the pinion 9 on which a movable contact SW1-a of the switch SW1 abuts. A film 12 has perforations 13 in which are engaged the teeth 6a of the aforesaid sprocket 6 so that the film 12 is transported to either the winding direction of arrow A or the rewinding direction of arrow B.

Figure 3:
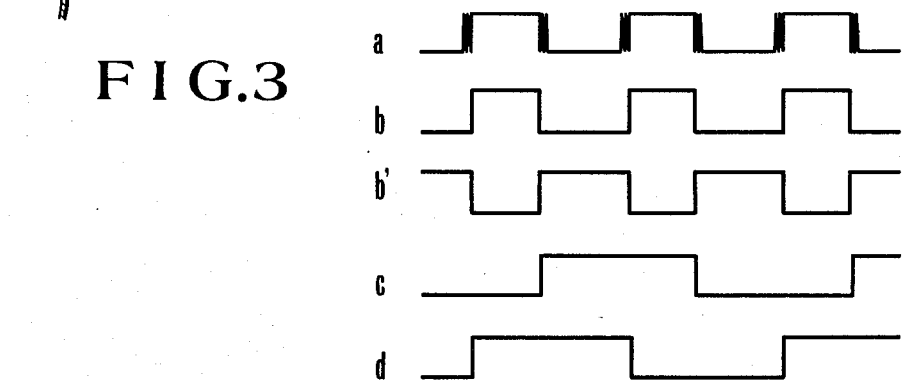
FIG. 3 is a pulse timing chart illustrating a manner in which the circuit of FIG. 1 operates.
Figure 4:
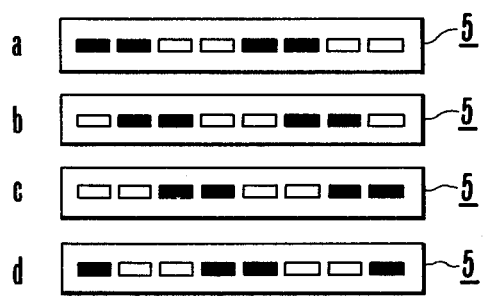
FIG. 4 illustrates different four patterns of the display of FIG. 1.

Referring to FIGS. 3 and 4 if the switch SW2 is closed, the sprocket 6 is driven by a motor (not shown) to rotate in the direction of arrow A so that the film 12 is transported in the direction of arrow, a, or wound up. Such movement of the sprocket 6 is transmitted through the shaft 7, gear 8, pinion 9 and shaft 10 to rotate the switch actuator cam 11 which in turn opens and closes the switch SW1 repeatedly with the production of a pulsated signal (on line (a) in FIG. 3), which is then applied to the wave-form shaping circuit 1. This wave-form shaping circuit 1 produces an output signal (on line (b) in FIG. 3), which is then combined with the signal from the switch SW2 in passing through the Exclusive NOR gate G1, thereby it is inverted as illustrated on line (b') in FIG. 3. The output of the G1 is applied to the clock terminal CLK of flip-flop FF. This flip-flop FF is a D-flip-flop of rising transit with its output terminal Q connected to the input terminal D so that the outputs change in response to the falling edge of the clock signal as a toggle flip-flop does. In this arrangement, the flip-flop FF produces an output, illustrated in FIG. 3(c), at the output terminal Q thereof. It is to be understood from this that the counter 2 functions as an UP counter.

Alternately assuming that the switch SW2 is opened to reverse the driving torque transmission so that the sprocket 6 rotates in the reverse direction from arrow B to transport the film 12 to the direction of arrow, b, or to effect rewinding, then the output signal of the wave-form shaping circuit 1 is applied through the Exclusive NOR gate G1 to the clock terminal CLK of the flip-flop FF. In this case, as the output signal appearing at the output terminal Q of the flip-flop FF takes another form illustrated on line (d) in FIG. 3, the counter 2 functions as a DOWN counter.

As the output signal of the aforesaid flip-flop FF is supplied through the decoder 3 to the display drive circuit 4, in the winding mode where the aforesaid flip-flop FF functions as the UP counter, the row of the display elements 5a to 5h presents different patterns of FIGS. 4(a) to 4(d) in time-displaced relation as if one and the same pattern were flowing to the right. Also in the rewinding mode were the aforesaid flip-flop FF functions as the DOWN counter, the displayed pattern changes flowing as FIG. 4(a)→(d)→(c)→(b)→(a) and so on. Changing of the displayed pattern informs the user that the film 12 is in progress, and the direction of flow of the displayed pattern enables the user to distinguish which of the film transportation modes is under way.

As in the aforesaid, display 5 use may be made of a liquid-crystal display (LCD), a light-emitting diode (LED) or the like. This display may also serve as a battery checker or an exposure factor display.

As has been described above, the present invention actuates the plurality of display sections successively in one direction so that the displayed pattern appears as if it were flowing, making it easy to recognize whether or not the film is under way. Another advantage arising from the change of flow direction of the aforesaid pattern is that it is easy to insure the switching of the film transportation mechanism to the desired mode.

As a means of sensing the film transportation conditions, instead of the aforesaid switch SW1, it is also possible to use a photosensitive element positioned on the opposite side of the path of film 12 to that in which a light source lies so that light from the source passes through the perforations 13 to the photosensitive element, and the output of the photosensitive element is connected to the input of the wave-form shaping circuit.

Another variation is that the UP/DOWN counter 2 may be constructed in the form of a shift register of simple structure.

What we claim:
1. A film transportation display device including:
 (a) pulse forming means for producing a pulse signal when a film is being transported;
 (b) a 1st circuit means for producing a plurality of pulse signals in a prescribed relationship based on the pulse signal from said pulse forming means;
 (c) display means for displaying film transporting conditions, said means having a plurality of display elements; and
 (d) a 2nd circuit means for actuating the plurality of display elements in said display means to present a display pattern as if it were flowing in one direction based on the plurality of pulse signals from said 1st circuit means.

2. A device according to claim 1, wherein said pulse forming means produces the pulse signal by a switch arranged to open and close in response to transportation of the film.

3. A device according to claim 1, wherein said 1st circuit means is a counter.

4. A device according to claim 1, wherein said 2nd circuit means is a decoder and a drive circuit.

5. A film transportation display device including:
 (a) pulse forming means for producing a pulse signal when a film is being transported;
 (b) changeover means for changing over the film transportation from one of the winding and rewinding modes to the other, said means producing a 1st signal when switched to the winding mode, and a 2nd signal when to the rewinding mode;
 (c) 1st circuit means to which are applied the pulse signal from said pulse forming means and the 1st signal or the 2nd signal from said changeover means, said means producing a 1st combination of a plurality of pulse signals when the 1st signal is applied, and a 2nd combination of a plurality of pulse signals when the 2nd signal is applied;
 (d) display means for displaying the film transporting conditions, said means having a plurality of display elements; and
 (e) 2nd circuit means for actuating the plurality of display elements so as to flow the display pattern in one direction based on said 1st combination of the plurality of pulse signals, and to flow the display pattern in the reversed direction based on the 2nd combination of the plurality of pulse signals.

6. A device according to claim 1, wherein the plurality of display elements in said display means are positioned side by side.

7. A device according to claim 6, wherein the direction of flow of the display pattern in the plurality of display elements is the same as that of transportation of the film.

* * * * *